（12) United States Patent
Schubert et al.

(10) Patent No.: US 11,294,356 B2
(45) Date of Patent: Apr. 5, 2022

(54) PRODUCTION CONTROL SYSTEM

(71) Applicant: MHP Management—und IT-Beratung GmbH, Ludwigsburg (DE)

(72) Inventors: Katharina Schubert, Meerbusch (DE); Christian Ewertz, Leinfelden-Echterding (DE); Markus Junginger, Bad Boll (DE); Martin Binder, Munich (DE); Rudolf Schmid, Achenmühle (DE); Doris Papaikonomou-Richter, Valley-Unterdarching (DE)

(73) Assignee: MHP Management- und IT-Beratung GmbH, Ludwigsburg (DE)

( * ) Notice: Subject to any disclaimer, the term of this patent is extended or adjusted under 35 U.S.C. 154(b) by 0 days.

(21) Appl. No.: 17/073,430

(22) Filed: Oct. 19, 2020

(65) Prior Publication Data

US 2021/0116890 A1 Apr. 22, 2021

(30) Foreign Application Priority Data

Oct. 17, 2019 (DE) .................. 102019128104.0

(51) Int. Cl.
*G05B 19/4155* (2006.01)
*G06F 16/36* (2019.01)
*G05B 19/418* (2006.01)

(52) U.S. Cl.
CPC ............ *G05B 19/4155* (2013.01); *G05B 2219/31025* (2013.01)

(58) Field of Classification Search
CPC ...... G05B 19/4155; G05B 2219/31025; G05B 2219/32015; G05B 2219/32347; G05B 19/41885; Y02P 90/02; G06F 16/367
See application file for complete search history.

(56) References Cited

U.S. PATENT DOCUMENTS

2016/0048126 A1* 2/2016 Bhattacharjya .. G05B 19/41865
700/105
2016/0067864 A1* 3/2016 Mullan .................. B25J 9/1605
700/19
2020/0333772 A1* 10/2020 Srivastava ............. G06Q 10/06

OTHER PUBLICATIONS

Wan et al. (An Ontology-Based Resource Reconfiguration Method for Manufacturing Cyber-Physical Systems), IEEE/ASME Transactions on Mechatronics, vol. 23, No. 6, Dec. 2018, pp. 2537-2546 (Year: 2018).*

* cited by examiner

*Primary Examiner* — Chad G Erdman
(74) *Attorney, Agent, or Firm* — Michael Soderman

(57) ABSTRACT

A production control system (1) having an arrangement of manufacturer-specific modules, comprising modules for controlling production units, modules for controlling logistics units and/or modules for providing and/or processing product data (6). Proprietary data models of manufacturer-specific modules are linked via at least one ontology unit.

10 Claims, 2 Drawing Sheets

PRODUCTION CONTROL SYSTEM

CROSS REFERENCE TO RELATED APPLICATIONS

This application claims the priority of DE 102019128104.0 filed on Oct. 17, 2019; this application is incorporated by reference herein in its entirety.

BACKGROUND

The invention relates to a production control system.

Such production control systems are generally used to control production equipment that can be used to produce different products. The term production equipment also includes complete production plants, i.e. factories.

In modern production plants, particularly factories, production processes and logistics procedures are largely automated. Modern factories, so-called smart factories, are subdivided into flexible production cells, where the logistics processes, in particular the transport of materials between the production cells, are handled by autonomous driving vehicles, in particular AGVs (automated guided vehicles).

It is known that such distributed units can be controlled via superordinate control systems in order to achieve optimized production processes. This allows optimizations such as avoiding downtimes of AGVs or improving the utilization of individual production cells.

However, a major problem is that the individual units form manufacturer-specific modules that have proprietary data models.

In product development, for example, product data of parts to be produced are generated in data models that differ from the data models of the production cells which need these parts, for example, to carry out assembly steps. The data models for the operation of logistics units such as AGVs, for example, are also configured differently.

This makes it difficult to coordinate the individual units of the production facility or factory. In particular, this makes it more difficult to automate and optimize processes in the production facility.

In principle, such problems can be mitigated by providing suitable interfaces between the individual units for performing data a conversion or the like. However, this results in considerable additional design work, especially since the production system has a plurality of manufacturer-specific modules with individual, different proprietary data models, thus requiring different interfaces at a system level.

SUMMARY

The invention relates to a production control system (1) having an arrangement of manufacturer-specific modules (21), comprising modules (22) for controlling production units (40), modules (23) for controlling logistics units (41) and/or modules (24) for providing and/or processing product data (6). Proprietary data models (31, 32, 33) of manufacturer-specific modules are linked via at least one ontology unit (20).
(FIG. 2)

DETAILED DESCRIPTION

The object of the invention is to provide a production control system of the type mentioned above, which has a simple, flexible architecture and at the same time a high level of functionality.

The features of the independent claims are intended to provide a solution to this object. Advantageous embodiments and appropriate further developments of the invention are described in the dependent claims.

The invention relates to a production control system having an arrangement of manufacturer-specific modules, comprising modules for controlling production units, modules for controlling logistics units and/or modules for providing and/or processing product data. Proprietary data models of manufacturer-specific modules are linked via at least one ontology unit.

The invention also relates to a method for production control.

By means of the ontology unit according to the invention, a semantic networking of all different proprietary data models of individual units of a production facility, for example, a complete factory, is achieved.

This enables a continuous exchange of information between all proprietary data models without having to provide individual interfaces at a system level. Rather, the semantic networking achieved with the ontology unit enables the data models to be mapped in a comprehensive digital model, a so-called digital twin, by means of which a bidirectional harmonizing data stream between all units of a production facility is made possible without additional hardware expenses at a system level. In particular, completely different proprietary data models from the areas of product development, production and logistics can be networked.

According to an advantageous embodiment of the invention, the ontology unit provides ontology-forming class structures, which have classes structured in hierarchies or groups, by means of which a semantic networking of the proprietary data models is feasible.

It is advantageous that the classification is carried out by means of meta models, which are structured in ontology libraries.

It is advantageous that the semantic networking of proprietary data models is configurable with these ontologies.

This allows flexible data mapping of all proprietary data models.

In a possible embodiment for a semantic networking of different proprietary data models the ontology unit has a specified number of inference units by means of which classes of ontologies are linkable.

The inference units form interface units for different proprietary data models.

The manner in which such a system functions is that the data of the proprietary data models are structured within multiple object models. Ontology-forming object models of this kind have class structures, which have classes structured in hierarchies or groups, where the classes are preferably assigned several attributes that are passed on by inheritance within a class structure. To access stored data, the ontology has a specified number of rules that are assigned to inference units. With the use of the rules, attributes of at least one class structure and/or classes of at least one class structure as well as stored data can be linked with each other. In this context, the rules represent the logical linking instructions which put the individual elements mentioned above into relation with each other in a specified manner. An evaluation is carried out in the inference units by assigning to these rules concrete values for the attributes, classes and/or data, thus generating specific output variables.

The inference units form interface units between the different proprietary data models.

The rules assigned to the inference units translate the structures of the object model of a first data model into the object model of the second data model. In this way, a defined assignment of the transferred data is always guaranteed when data is transferred from one data model to another.

According to an advantageous design, the ontologies are described by means of standard protocols.

In particular, an RDF (Resource Description Framework) is used as standard protocol.

By using such industry standards, the ontology units can be extended to open libraries.

An advantageous ontology structure is characterized in that an ontology unit is provided in the form of a resource unit, which is configured to generate data that define production processes.

Furthermore, an ontology unit in the form of a process unit is provided, which is configured to program production and/or logistics units.

Furthermore, an ontology unit in the form of a product unit is provided, which is configured to process product data.

For these individual ontology units, a superordinate ontology unit is provided, which forms a control logic for these individual ontology units.

With the resource units, process units and product units, all relevant processes of a production unit can be mapped, which are coordinated via the superordinate ontology unit.

With the ontology units, a complete virtualization of all physical and digital components of a production facility is achieved. It is advantageous to assign a normalization layer to these ontology units to generate executable instructions for these components.

According to an advantageous embodiment of the invention, self-learning sets of rules are provided.

In this way, machine learning methods which are known in principle can be used in particular to draw conclusions about changes in the entire production facility and to optimize existing processes, especially production and logistics processes. The entire production control system thus forms a closed, controllable system. In particular, a continuous adaptation of the data streams is achieved over the entire product life cycle of the products to be produced.

According to another advantageous design, the production control system according to the invention is integrated into a cloud computer network.

The optimization of the production control system is thus not limited to local machine learning methods, but is extendable to globally networked systems, where applicable.

BRIEF DESCRIPTION OF THE DRAWINGS

The invention is explained below on the basis of the drawing. The figure shows.

DETAILED DESCRIPTION OF THE PREFERRED EMBODIMENTS

Figure 1:
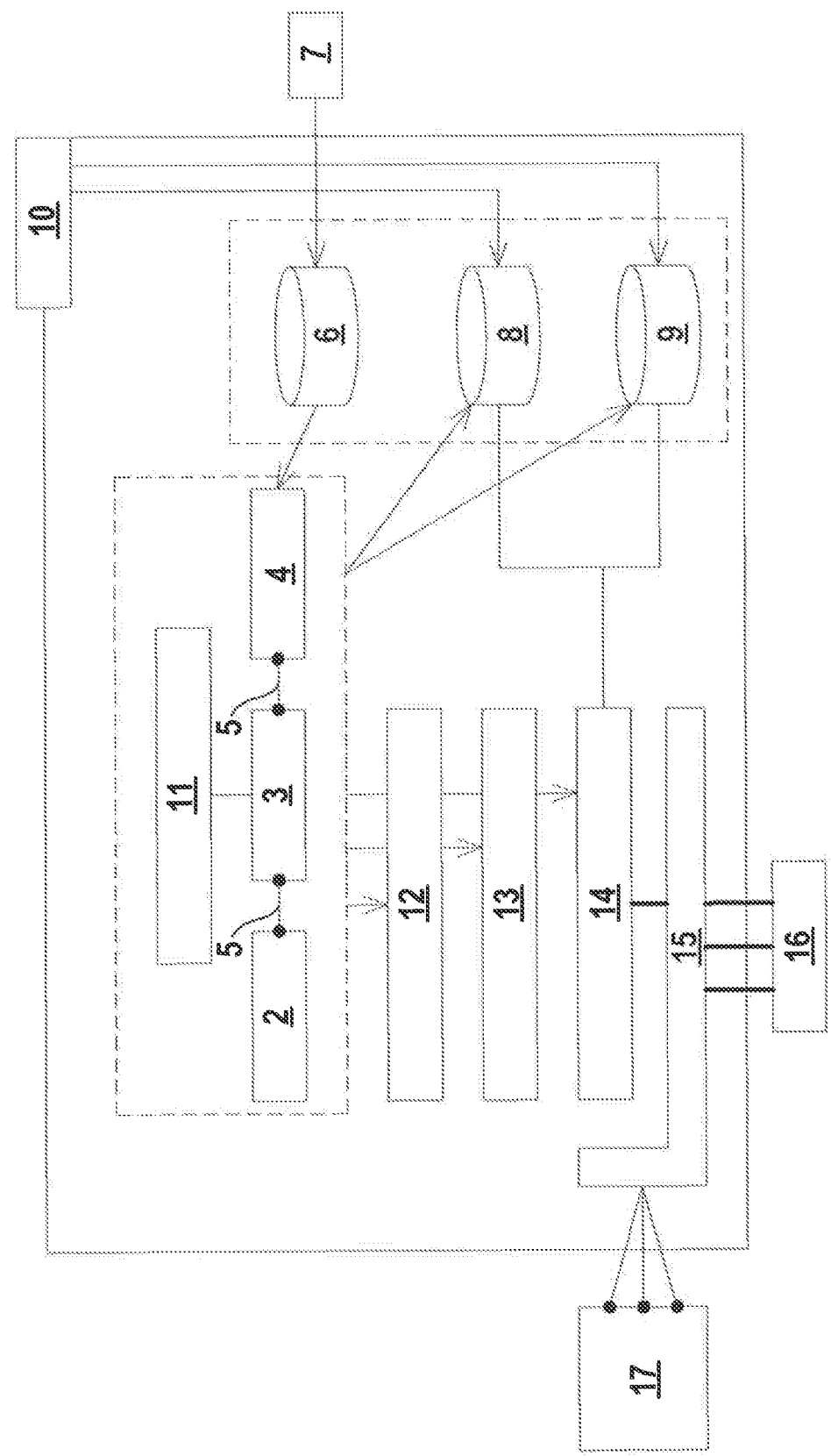
FIG. 1: A block diagram of an embodiment example of the production control system according to the invention.
Figure 2:
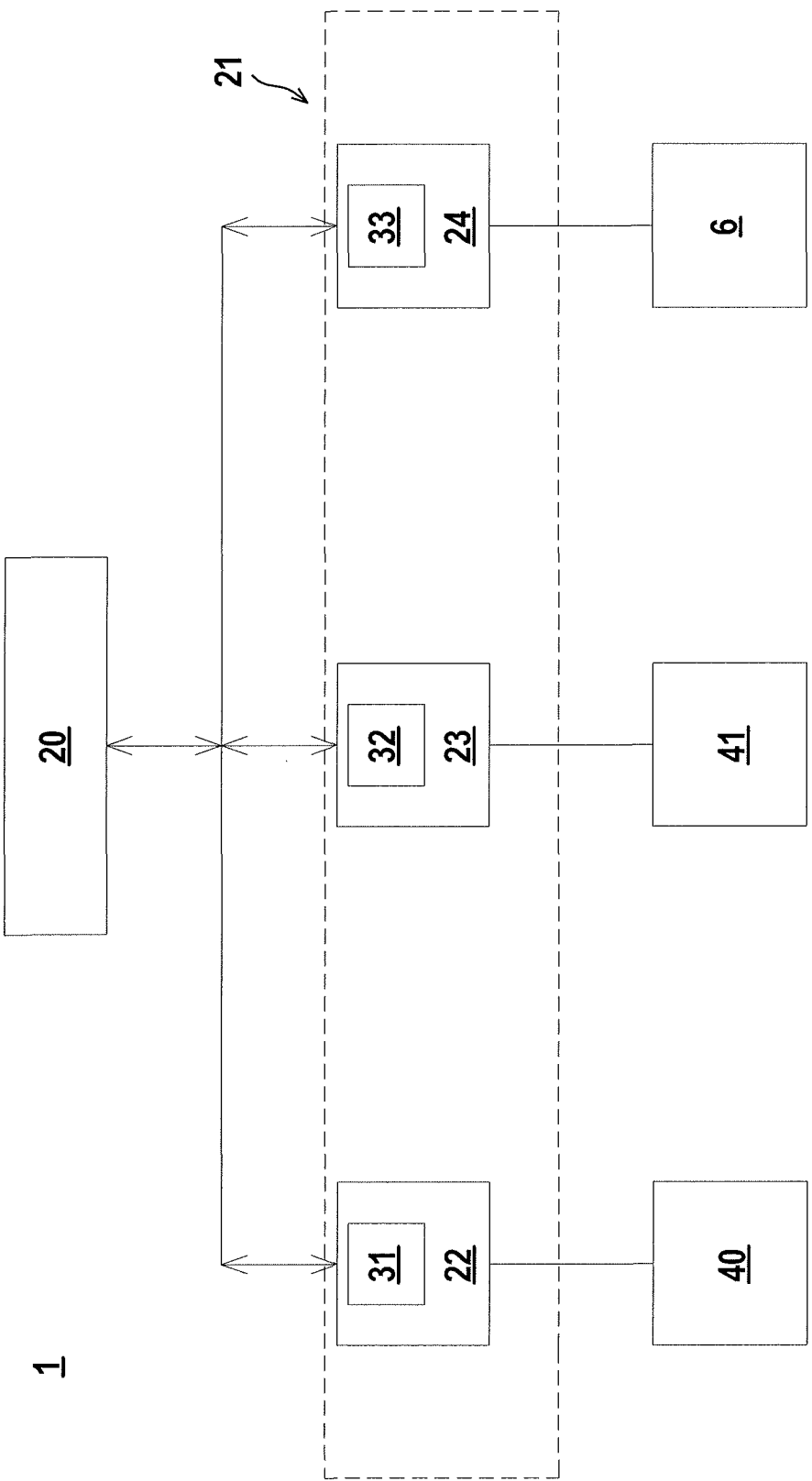
FIG. 2: Schematic representation of the production control system according to the invention

FIG. 1 shows an embodiment example of the production control system 1 according to the invention. The production control system 1 serves to control production processes and logistics processes in a production facility. In the present case, the production facility is formed as a so-called smart factory, in which an arrangement of production cells and multiple autonomous driving vehicles, in particular AGVs (automated guided vehicles), are provided. Different production or assembly processes are executed in the individual production cells. Logistics processes are carried out with the autonomous driving vehicles. In particular, AGVs are used to transport materials, parts to be produced or assembled units.

The production unit may be used in particular for the production of motor vehicles.

According to the invention, the production control system 1 has an arrangement of ontology units by means of which proprietary data models of manufacturer-specific production cells, logistics units and also product development-specific data and processes are semantically networked.

In general, an ontology unit provides ontology-forming class structures, which have classes structured in hierarchies or groups, by means of which a semantic networking of the proprietary data models is feasible.

Appropriately, the semantic networking of the proprietary data models is configurable.

Advantageously the ontologies are described by means of standard protocols.

In particular, an RDF (Resource Description Framework) is used as standard protocol.

As FIG. 1 shows, a resource unit 2, a process unit 3 and a product unit 4, which are controlled by a unit control logic 11 as superordinate ontology unit, are provided as ontology units. These ontology units form a virtual model of the processes carried out in the production facility.

In the individual ontology units ontology-forming object models are provided, which are linked with each other via suitable ontological links 5, such as inference units, and thus manage a semantic networking of proprietary data models existing in the resource unit 2, the process unit 3 and the product unit 4.

In the resource unit 2, ontologies are used to structure and digitally make available data that describe and define production processes. The data form production-specific proprietary data models, which are integrated via ontologies into a harmonized data stream that can flow across all units of the production facility.

The production sequences generally include not only production processes but also logistics processes.

In the process unit 3, specific production processes for production or work means such as robots are programmed in an executable program code (e.g. in a PLC code) in dependence on data from proprietary data models of the resource unit 2 and the product unit 3. The ontologies enable a harmonizing data transfer between the process unit 3 and the resource unit 2 and the product unit 4 without having to provide interfaces for that purpose at a system level.

Product data 6 are provided and made available in the product unit 4. As FIG. 1 shows, in dependence on external, customer-specific product specifications 7 product data 6 are made available to the product unit 4 in proprietary data modules, for example as CAD data.

These product data 6 are processed and made available in the product unit 4. In particular, the product data 6 are stored permanently, preferably non-volatilely, as persistence data 8 in a working memory as unchangeable storage means.

Furthermore, using the ontologies of the product unit 4, digital models are generated from the product data 6, which are stored as so-called digital twins 9.

The persistence data 8 and the digital twins 9 can be analyzed by means of an analysis unit 15.

The resource unit 2, the process unit 3 and the product unit 4, which have ontologies, are controlled and coordinated by a superordinate ontology unit as control logic 11.

On the whole, the resource unit 2, the process unit 3, the product unit 4 and the superordinate ontology unit form an ontology model with which all proprietary data models of the production unit are semantically networked, such that a standardized, harmonized data stream of all data of the overall system is achieved between all units of the production unit, without the need to use physical interfaces at a system level to adapt data to be transmitted.

The resource unit 2 is used to prepare proprietary data from machine manufacturers who supply and provide work or production means such as processing machines and logistics units such as AGVs with defined functionalities.

The product unit 4 is used to prepare and provide customer-specific proprietary product data 6.

Finally, in the process unit 3 proprietary data are also generated by process designers by generating there executable program codes for production or work means.

The data and programs generated in the resource unit 2, the process unit 3 and the product unit 4 are fed to a validation layer 12 and a programming layer 13.

A check and validation of created program codes is performed in the validation layer 12. In particular, commissioning is carried out by checking whether the programmed processes are feasible, in particular whether they are collision-free.

After successful validation, machine codes for the production and work means are generated using the programming layer 13.

A normalization layer 14 is provided as a further component of the ontology model according to the invention. There, program code written in high-level languages is translated into application software such as PLC software.

Finally, an adapter layer 15 is provided, which establishes the connection to communication units 16 such as mail, internet and the like. In addition, the adapter layer 15 is used to establish connections with external units 17 of suppliers, partner companies and the like.

LIST OF REFERENCE NUMERALS (1) Production Control System
(2) Resource unit
(3) Process unit
(4) Product unit
(5) Link
(6) Product data
(7) Product specification
(8) Persistence data
(9) Digital twins
(10) Analysis unit
(11) Control logic
(12) Validation layer
(13) Programming layer
(14) Normalization layer
(15) Adapter layer
(16) Communication unit
(17) External units
(20) Ontology unit
(21) Arrangement of manufacturer-specific modules
(22) Modules for controlling production units
(23) Modules for controlling logistics units
(24) Modules for providing and/or processing product data
(31) Proprietary data model
(32) Proprietary data model
(33) Proprietary data model
(40) Production units
(41) Logistics units

The invention claimed is:

1. A production control system (1) having an arrangement of manufacturer-specific modules, comprising modules for controlling production units, modules for controlling logistics units and/or modules for providing and/or processing product data (6), wherein proprietary data models of the manufacturer-specific modules are linked via at least one ontology unit, wherein in the ontology unit ontology-forming class structures are provided, which have classes structured in hierarchies or groups, by means of which a semantic networking of the proprietary data models is feasible, wherein the ontology unit has a specified number of inference units by means of which classes of ontologies are linkable, and wherein the inference units form interface units for different proprietary data models.

2. The production control system (1) according to claim 1, wherein the semantic networking of the proprietary data models is configurable.

3. The production control system (1) according to claim 1, wherein the ontologies are described by means of standard protocols.

4. The production control system (1) according to claim 3, wherein an RDF (Resource Description Framework) is used as standard protocol.

5. The production control system (1) according to claim 1, wherein an ontology unit is provided in the form of a resource unit (2), which is configured to generate data that define production processes.

6. The production control system (1) according to claim 1, wherein an ontology unit is provided in the form of a process unit (3), which is configured to program production and/or logistics units.

7. The production control system (1) according to claim 1, wherein an ontology unit is provided in the form of a product unit (4), which is configured to process product data (6).

8. The production control system (1) according to claim 1, wherein a superordinate ontology unit is provided as ontology unit, which forms a control logic (11).

9. The production control system (1) according to claim 1, wherein self-learning sets of rules are provided.

10. The production control system (1) according to claim 1, wherein said production control system is integrated into a cloud computer network.

* * * * *